Figure 1:
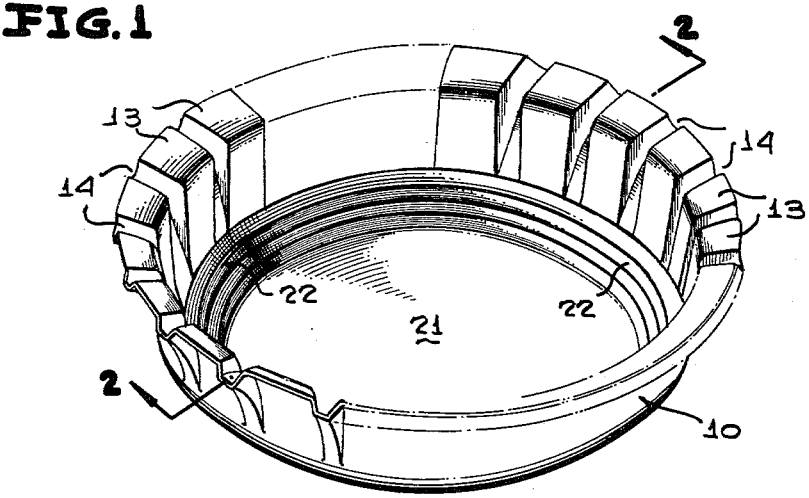

July 20, 1965

H. E. BROCKETT 3,195,754

ALUMINUM CONTAINING SEAL LINERS FOR BEER
CONTAINERS AND LIKE SUBSTANCES
Filed March 18, 1963

INVENTOR
HALFORD E. BROCKETT

BY
Mann, Porter, Willer & Stewart
ATTORNEYS ns3,195,754
ALUMINUM CONTAINING SEAL LINERS FOR BEER CONTAINERS AND LIKE SUBSTANCES
Halford E. Brockett, Elmhurst, Ill., assignor to Continental Can Company, Inc., New York, N.Y., a corporation of New York
Filed Mar. 18, 1963, Ser. No. 265,848
9 Claims. (Cl. 215—39)

This invention relates to closure seals for containers of beer and like substances, in which the seal includes a liner which presents aluminum to the contents of the container.

It is known to employ crown caps as closure seals for beer bottles, in which an aluminum disk is employed over the bottle mouth; and to form a sheet of a resinous material having flake aluminum therein, cutting disks therefrom, and employing such disks as closure liners. The purpose was to seal the fluid contents within the containers under conditions by which fluid and gaseous components of the contents were prevented from passing through the liner and forming a chemical product with the metal of the closure shell, with return of the product back through the liner to the bottle contents with deleterious action thereon. In such cases, the liner so produced required a cushion between it and the shell, to assure a proper sealing upon the container lip; in practice, this was usually provided by a compressible cushion of cemented cork particles.

It is also known to employ elastomers such as rubber and resins to form such liners, by molding operations. For example, a plastisol of fine vinyl chloride resin particles and a plasticizer has been deposited in a crown shell; and, by shaping and heating operations, the resin and plasticizer have been caused to inter-dissolve or cure to form an elastic shaped mass adherent in the shell.

In malt beverages, such as beer and ale, flavor is a pre-requisite: and maintenance of flavor demands great care in sterilization and selection of wort components, of the yeast, and of the time and temperature of brewing. The after-treatment by aging and mixing is followed by packaging in barrels, bottles, cans and like containers. The material of the container and of the closure seal can have an effect upon the flavor Most malt beverages are packaged and shipped in sealed containers, with a content of dissolved carbon dioxide, and under a pressure such that upon opening, this gas escapes and the liquid effervesces. The presence of such carbon dioxide is a factor of carbonation. The beer before packaging usually has air dissolved therein at a partial pressure compared to the carbon dioxide, noting the lesser solubility of oxygen and nitrogen in aqueous liquids. The amount of carbon dioxide is deliberately controlled to a specified level for the particular beer; and the endeavor is made to restrict the air content as much as possible, by precautions to restrict air access and by use of jetters and other means during the filling and closing of the containers, for example. The bottle contents may be caused to foam so that air is expelled and the head space largely filled by bubbles containing carbon dioxide.

When closure seals with aluminum spots are employed on bottles, for example, there is a ratio of surface exposure of aluminum, to the volume of the contents, at which satisfactory flavor and color results are attained. When the ratio is too high, a bleaching can occur which is especially objectionable for dark beers and ales: and yet the standardization of bottle necks and of crown seal series demands a certain minimum area in order that the spot can perform its function.

Liners of various resinous and rubber compositions have been proposed; but tasters have found flavor differences of beer and other beverages so bottled, from the same material when bottled by use of aluminum spotted liners.

It has been found that under the present invention, an aluminum exposure can be presented which is advantageous for the malt beverage, but does not produce deleterious color change or off-flavoring for the selected beverage and gives the same flavor effect as tasters observe for beverages bottled with cork liners having aluminum spots.

An illustrative practice under the invention is shown on the accompanying drawing, which shows a crown cap shell having therein an adherent liner according to the present invention.

Figure 2:
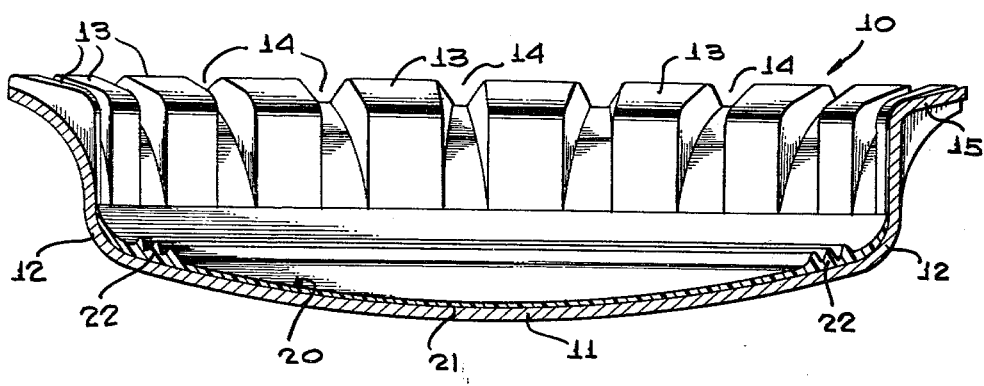

In the drawing:
FIGURE 1 is a perspective view of such a closure;
FIGURE 2 is an axial diametrical section.

In these drawings, the crown shell 10 is shown with a domed central portion 11 merging into a curved portion 12 known as the top corner radius. The edge of the shell provides a corrugated skirt above the outer margin of the top corner radius, with the alternate ribs 13 and grooves 14; and ribs having portions 15 with a small upward and outward slope in FIGURE 2, and flared portions. This is a known conformation shown illustratively but not specifically claimed herein; and permits crimping upon a container neck.

The liner 20 has a central circular portion 21 which may be one or two thousandths of an inch thick; and integral therewith a thicker annular portion 22 which may be formed as a plurality of concentric ribs as taught in the Schneider Patent 2,752,059.

The lower face of the liner in FIG. 2 is adherent to the portions 11, 12 of the shell, and the liner preferably does not extend above the lower ends, FIG. 2, of the grooves 14.

EXAMPLE I

A plastisol comprising 100 parts polyvinyl chloride particles, 70 parts of dioctyl phthalate, 4 parts of titanium dioxide, 0.1 part of carbon black, 2 parts of a polyvinyl chloride stabilizer (calcium stearate), and 1 part of a thixotropic agent, is a pasty mass at room temperature, and may be pumped through a conduit and a deposit nozzle. The quantities herein are stated by weight. Even at 110 degrees F., the dioctyl phthalate has little solvent action on the polyvinyl chloride: but at elevated temperatures of 300 degrees F. and over, the inner-solution is rapid and the plastisol forms a stiff rubbery elastomer. The active components are the resin particles and the dioctyl phthalate which acts as a plasticizer for the resin when the elastomer has been formed.

Other suitable stabilizers are zinc and other stearates. Epoxidized soybean oil and other epoxidized oils can be employed as stabilizers and plasticizers. The thixotropic agent is added for viscosity control purposes: inert powdery materials perform the function: finely divided silicon dioxide was employed in the several examples.

Before use, the viscuous platsisol has mixed therewith 10 parts of non-leafing aluminum powder per 100 parts of plastisol, by weight. Such powder may be so-called atomized aluminum powder of commerce (the product available under the trademark Reynolds #120 has been found satisfactory), with 100 percent passage through a 100-mesh screen, and 80 percent through a 325-mesh screen, and an average particle size of 20±5 microns, and an apparent density of 1.00±0.1.

EXAMPLE II

The same plastisol as in Example I had 20 parts per 100 parts of plastisol of the same aluminum powder mixed therewith.

EXAMPLE III

The same plastisol as in Example I had admixed therewith 15 parts per 100 parts of plastisol resin, of a leafing-type flake aluminum with a low lubricant content: the maximum retention on a 325-mesh screen for the powder use was 1 percent, the bulking value was 0.047 gallon per pound, and the weight per solid gallon was 21.24 pounds: the material commercially available under the trademark Reynolds #28XD was found satisfactory.

EXAMPLE IV

The same plastisol was used; with 20 parts per 100 parts of plastisol resin, of the leading powder of Example III.

The plastisol and aluminum mixtures of each example were deposited in standard crown shells, as shown in the drawings, with about 200 milligrams per shell. The shells had been formed from tin plate with a vinyl chloride: acetate polymer lacquer. The shells were heated to about 350 degrees F., and a shaping punch at about the same temperature was introduced, sealing against the shell at the upper part of the top corner radius and then being effective to flatten the shell dome and thus effect distribution of the mass into its shaped form. After complete dissolution of the resin in the plasticizer, the closure seal was cooled and applied to bottles of beer.

The beer as usual contained carbon dioxide and some dissolved air. Test packs with commercial aluminum spotted crowns, with crowns having liners of the above plastisol without aluminum powder, and with crowns having liners of the mixtures of the above Examples, were prepared in standard 7 ounce beer bottles, using a commercial packing method. Specimens of each type were stored at 100 degrees F., both upright and inverted. The test values of Table I were obtained at the beginning (Initial) and after the stated storage period. These tests were conducted as usual by piercing the closure with a conventional pressure testing apparatus with the bottles in upright position, and the total pressure was determined. The gas was then passed to a caustic alkali solution to absorb the carbon dioxide; and the non-absorbed gas was then analyzed by separating in a chromatograph column, with determinations for hydrogen, oxygen, nitrogen, and argon. The "air content" or head space volumes averaged around 1 milliliter as with good brewery practice: and hence the chromatographic method was employed because of the small volume for test. Other evaluations as to beer stability, color, turbidity and foam stability were made on the bottle contents; but no significant difference was noted. Each report in Table I is the average of three samples under the specified condition.

In Table I, Code "00" is for use of commercial cork liners with aluminum spots: Code "14" for use of liners of cured commercial plastisol as in Example I, but without aluminum powder: Code "01" is for liners with 10 parts of aluminum powder per Example I: Code "02" is the same, with 20 parts of atomized aluminum powder, per Example II: Code "19" is for another plastisol with no aluminum powder: Code "21" is for a plastisol with 15 parts of aluminum powder, per Example III: Code "22" is for a plastisol with 20 parts of aluminum powder, per Example IV: Code "18" is for a plastisol with 20 parts of atomized aluminum powder. The notation "I" under "Storage" shows the initial values shortly after filling and closing: "A" are the values after 30 days' storage in upright position: "B," after 30 days' storage in inverted (top down) position; "C," after 60 days' storage in upright position; and "D," after 60 days' storage in inverted position. The gas analysis values are shown in milliliters: "LO" denotes that the quantity was less than the minimum value (0.005 ml.) readable: the "O" (oxygen) values were corrected for argon: the "Other" gases were chiefly argon. Z–N denotes the Zahm-Nagel reading for "air" in average milliliters obtained as prescribed by the American Society of Brewing Chemists, with the composition then being determined by passage through silica gel and molecular sieve columns and detected by a thermistor conductivity cell connected to a recorder. "Carb" denotes the carbonation in average volumes obtained as prescribed by the American Society of Brewing Chemists, being obtained by measuring the equilibrium pressures after shaking the bottles, with unity or one volume being the gas volume referred to standard temperature and pressure (0° C. and 760 mm. mercury), and being equal to the volume of the liquid from which the gas came. Beers are normally carbonated at 2.5 to 3.0 volumes.

*Table I*

| Code No. | Storage | Air Analysis in ml. | | | | | |
|---|---|---|---|---|---|---|---|
| | | H | O | N | Other gases | Z–N | Carb. |
| 00 | I | LO | 0.014 | 0.64 | 0.009 | 0.66 | 2.46 |
| | A | 0.014 | 0.008 | 0.80 | 0.011 | 0.83 | 2.50 |
| | B | 0.417 | 0.012 | 0.76 | 0.010 | 1.20 | 2.74 |
| | C | | | | | | |
| | D | 1.040 | 0.020 | 0.90 | 0.011 | 1.97 | 2.54 |
| 14 | I | LO | 0.033 | 0.91 | 0.012 | 0.96 | 2.51 |
| | A | LO | 0.034 | 0.95 | 0.012 | 1.00 | 2.70 |
| | B | LO | 0.029 | 1.45 | 0.019 | 1.50 | 2.30 |
| | C | 0.012 | 0.034 | 1.16 | 0.015 | 1.22 | 2.54 |
| | D | 0.041 | 0.023 | 1.39 | 0.018 | 1.45 | 2.28 |
| 01 | I | LO | 0.038 | 1.44 | 0.019 | 1.50 | 2.41 |
| | A | 0.016 | 0.031 | 1.38 | 0.018 | 1.45 | 2.64 |
| | B | 0.147 | 0.062 | 2.13 | 0.028 | 2.37 | 2.44 |
| | C | 0.042 | 0.030 | 2.28 | 0.030 | 2.38 | 2.43 |
| | D | 0.290 | 0.028 | 1.51 | 0.020 | 1.85 | 2.19 |
| 02 | I | 0.009 | 0.024 | 0.76 | 0.010 | 0.80 | 2.46 |
| | A | 0.013 | 0.030 | 1.29 | 0.017 | 1.35 | 2.72 |
| | B | 0.157 | 0.019 | 1.16 | 0.015 | 1.35 | 2.30 |
| | C | 0.021 | 0.029 | 0.97 | 0.012 | 1.03 | 2.42 |
| | D | 0.337 | 0.028 | 1.80 | 0.023 | 2.18 | 2.32 |
| 19 | I | LO | 0.052 | 1.34 | 0.017 | 1.41 | 2.55 |
| | A | LO | 0.036 | 1.30 | 0.017 | 1.35 | 2.67 |
| | B | LO | 0.023 | 1.56 | 0.020 | 1.60 | 2.40 |
| | C | LO | 0.034 | 1.48 | 0.019 | 1.53 | 2.41 |
| | D | 0.013 | 0.028 | 1.45 | 0.019 | 1.52 | 2.68 |
| 21 | I | 0.022 | 0.009 | 0.72 | 0.010 | 0.76 | 2.46 |
| | A | 0.059 | 0.020 | 1.66 | 0.022 | 1.77 | 2.53 |
| | B | 0.330 | 0.022 | 0.81 | 0.010 | 1.17 | 2.41 |
| | C | 0.108 | 0.014 | 0.85 | 0.011 | 0.98 | 2.39 |
| | D | 0.630 | 0.018 | 1.22 | 0.016 | 1.88 | 2.42 |
| 22 | I | 0.017 | 0.012 | 0.69 | 0.009 | 0.73 | 2.44 |
| | A | 0.047 | 0.013 | 0.96 | 0.012 | 1.03 | 2.42 |
| | B | 0.313 | 0.020 | 0.92 | 0.012 | 1.27 | 2.28 |
| | C | 0.073 | 0.020 | 0.88 | 0.011 | 0.98 | 2.35 |
| | D | 0.640 | 0.040 | 1.89 | 0.025 | 2.58 | 2.45 |
| 18 | I | LO | 0.024 | 0.77 | 0.010 | 0.81 | 2.51 |
| | A | LO | 0.045 | 1.49 | 0.019 | 1.55 | 2.69 |
| | B | 0.113 | 0.014 | 1.14 | 0.015 | 1.28 | 2.33 |
| | C | 0.008 | 0.039 | 1.70 | 0.022 | 1.77 | 2.41 |
| | D | 0.270 | 0.015 | 0.87 | 0.011 | 1.17 | 2.64 |

The tests reported in Table I show a definite and significant increase in hydrogen for the inverted samples closed with crowns having aluminum spots or made of an elastomer containing aluminum powder. Comparably, in the absence of the aluminum, the significant increase of hydrogen did not occur. This is attributed to the contact of the liquid with the aluminum. The bottles stored in upright position, where the gas-filled head space intervened between the fluid and the aluminum spot or aluminum-containing elastomer, showed a slight but measurable increase in hydrogen; while those with non-aluminum closures showed essentially no increase.

The liners containing aluminum powder can be made from other formulations of thermoplastic resins such as other vinyl chloride homopolymers, or copolymers of vinyl chloride with vinyl acetate, with vinyl acetate and maleic anhydride, and with vinylidene chloride. Other plasticizers can be used as the non-volatile vehicle, such as dibutyl and other alkyl phthalates which are solvents for the polymer resin at temperatures of 275° F. to 425° F. The resin may be present in a form which has been milled with the aluminum powder.

The body mass in which the aluminum powder is exhibited in the finished liner can be of an elastomer other than one made from plasticized vinyl resin. The low, medium and high density polyethylenes, polypropylene and polystyrene can have the aluminum powder incorporated therein by milling when softened by heating to 300 to 500° F. Natural rubber compositions devoid of volatile components, and the synthetic rubber compounds known as Buna "S," Buna "N," and neoprene can be so mixed with the aluminum powder. When the aluminum-containing mixture is fluid, as with the plastisols of the above examples, such may be deposited in measured quantity as a fluid and cured while heating and shaping, or the crown shell with deposit therein may be spun and heated for distributing and curing. The mixtures may be present as latices with water or other vehicle, and the shells charged and spun while heating to expel the vehicle. Disks or pellets of non-fluid mixtures can be placed in the shells and molded therein, preferably with use of heating for the shell and shaping punch and subsequent rapid cooling; or such may be molded externally to the shell and then placed therein, and held in the shell as by mechanically forcing an over-sized liner into the shell, or by use of an adhesive lacquer with heating if required for adhesion, or by use of a separate adhesive.

Useful plastisol compositions for the aluminum powder admixture include those composed of:

|  | Parts |
|---|---|
| Polymer resin | 100 |
| Plasticizer | 60–100 |
| Stabilizers | 1–5 |
| Thixotropic agents | 0–5 |
| Pigments | as required. |

The proportions are by weight. Carbon black is a suitable pigment for gray tones: titanium dioxide of pigment type is useful for light tones.

In practice, from 1 to 40 parts by weight of aluminum powder per 100 parts by weight of elastomer can be employed; with preference for 5 to 20 parts.

The employment of non-leafing aluminum powder is preferred in plastisol and like fluid mixtures, as they permit larger quantities to be present without major increase of viscosity and appear to have less effect on the color of the beverage and liner appearance while obtaining the desired chemical reaction with the beverage and preferred flavor and other effects on beverage aging. With leafing powders, a lesser proportion can be used because such powders tend to come to the surface of the liner and a greater reactive area is exhibited to the product.

The action of the aluminum appears to be the development of a significant hydrogen content in the headspace gas, possibly by reaction with the water and acids present; and there also appears to be a significant decrease in the oxygen content of the gas. The chemical effects illustrate some of the changes that take place in the beverage and which affect the maintenance of desirable flavor and odor characteristics and color on storage and aging.

The shells for attachment to the container may be of metal, of plated metal, or of plastic: and may be of other than crimped-on type. The closures may be applied to containers having appropriately shaped ends, such as glass bottles, metal cans, and plastic containers.

The illustrative embodiments are not restrictive; and the invention may be practiced in many ways within the scope of the appended claims.

What is claimed is:

1. A closure seal for containers of carbonated malt beverages, comprising a shell adapted for mechanical engagement with the container and extending over the container mouth, and a liner in said shell and being a shaped mass having a thickened annular portion for engaging and sealing the container lip and composed of a thermoplastic elastomer selected from the group consisting of plasticized vinyl chloride polymers, polystyrene, polyethylene, and rubber and having in substantially uniform distribution therein particles of aluminum in the proportion of 1 to 40 percent by weight of the total liner material.

2. A closure seal as in claim 1, in which the aluminum powder is of non-leafing form.

3. A closure seal as in claim 1, in which the liner is the product of heating a plastisol comprising particles of vinyl chloride polymer resin in a non-volatile plasticizer which is an elevated temperature solvent thereof, with the aluminum particles suspended in the solvent plasticizer.

4. A closure seal as in claim 1, in which the shaped liner is of polyethylene with the aluminum powder in uniform distribution therein.

5. A closure seal as in claim 1, in which the shaped liner is of polystyrene with the aluminum powder in uniform distribution therein.

6. A closure as in claim 1, in which the shaped liner is of a rubber with the aluminum powder in uniform distribution therein.

7. A liner composition for closure seals of containers of carbonated malt beverages consisting for essential ingredients thereof of 100 parts of a vinyl chloride polymer resin, 60 to 100 parts of a non-volatile plasticizer for said resin, 1 to 5 parts of a vinyl polymer resin stabilizer, and 5 to 20 parts of aluminum powder intimately distributed in the plasticized resin.

8. A liner composition as in claim 7, in which at least 80 percent of the aluminum powder will pass through a 325 mesh screen.

9. A liner composition as in claim 8, in which the aluminum powder is of non-leafing type.

References Cited by the Examiner

UNITED STATES PATENTS

| 2,528,934 | 11/50 | Wiles | 260—37 |
| 2,543,774 | 3/51 | Gora | 215—39 |
| 2,581,647 | 1/52 | Genovese | 215—39 |
| 2,748,099 | 5/56 | Bruner et al. | 260—37 |
| 2,843,554 | 7/58 | Murphy | 260—37 X |

THERON E. CONDON, *Primary Examiner.*

EARLE J. DRUMMOND, GEORGE O. RALSTON, *Examiners.*